Jan. 30, 1940.   T. J. WALSH   2,188,764
CAMERA
Filed April 8, 1938
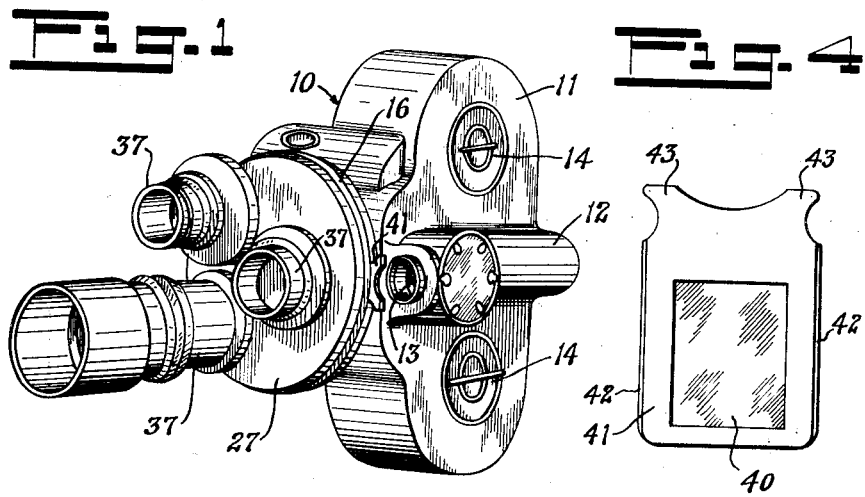
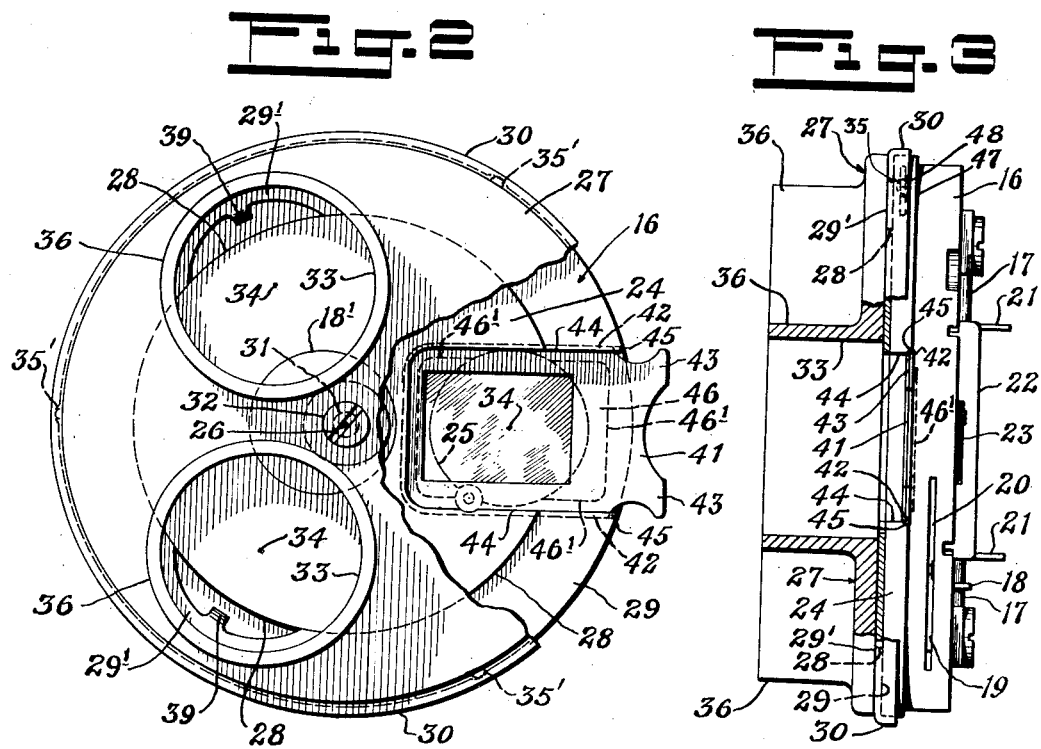
INVENTOR.
Thomas J. Walsh
BY William L. Morris
ATTORNEY.

Patented Jan. 30, 1940

2,188,764

UNITED STATES PATENT OFFICE 2,188,764

CAMERA

Thomas J. Walsh, West Hempstead, N. Y., assignor to Thomas J. Walsh and Giovanni B. Antofilli, a copartnership doing business as National Cine Laboratories, New York, N. Y.

Application April 8, 1938, Serial No. 200,814

5 Claims. (Cl. 95—44)

The present invention relates to means whereby to adapt certain types of cameras to the use therein of color filters. More particularly, the invention relates to means of the character mentioned, in an application thereof to the so-called "Bell & Howell—Eyemo Camera—Small Turret Model".

This type of camera is a popular one, and has been on the market for years. It has never been adapted to the use of color filters, although the desirability of such adaptation has long been apparent. As its name indicates, it is a turret type of camera. The turret is revoluble on an element which houses the shutter and intermittent mechanism, and certain other parts. The bearings and controls for the turret on the housing, and the size and compactness of the housing and parts contained therein, present an assembly which apparently precludes the feasibility of color filter slides in the camera.

It is an object of this invention to extend the useful field of this and other cameras by certain simple and inexpensive alterations or variations in the structure thereof which permit of quick and facile insertion, removal, and interchangeability of color filters therein when desired, without affecting the usefulness of the camera without a color filter, if none is desired.

In the embodiment of the invention, hereinafter described, the wall of the housing which supports the turret has been cut or shaped in such manner as to provide a suitably positioned slideway for a color filter holder, without impairing the effectiveness of any bearing or control for the turret on the housing, or of any mechanism within the housing, and without any consequential weakening or impairment of the structure as a whole.

Other objects and features of the invention will hereinafter more fully appear in connection with accompanying drawing, in which:

Fig. 1 is a perspective view of the assembled main casing, combination shutter and intermittent housing, and turret and lens mounts thereon.

Fig. 2 is a front view of the camera, the main casing and turret lens barrels being omitted, and the turret plate being broken away, more clearly to show certain underlying parts embodying the present invention.

Fig. 3 is a view in side elevation, partly cross-sectional, of the Fig. 2 structure.

Fig. 4 is a plan view of the filter holder.

Referring to the drawing, there is shown the main casing 10, which houses the film rolls, driving mechanism, and other well known parts not shown. The side plate 11 of casing 10 constitutes a door, which may be opened or removed for access to the interior, and which serves as a mount for a view finder 12, having a finder lens 13—all of well known construction. The door has the usual locks 14.

Set against the front face of the main casing 10, and bolted thereto in suitable manner, is a cylindrical housing 16 for the shutter and intermittent mechanisms, aperture plate and other features of the hereinbefore mentioned "Bell & Howell" camera. The shutter and its driving mechanism, and the means for effecting intermittent feed of the film, being well known, are not shown in full in the drawing. Certain parts thereof, however, do show in the drawing. For instance, parts of the intermittent show at 17 and 18 in Fig. 3; and at 19 in slot 20, (Fig. 3), is indicated the shutter brake. A bearing disk 18' concerned with the shutter and intermittent mechanisms is also shown in Fig. 2. Again, although not features of the invention, there are indicated in Fig. 3 the aperture film guide 21; the aperture side pressure plate 22; and the front aperture plate 23.

In the "Bell & Howell" camera mentioned, there is a circular aperture 25 through the front wall 24 of the housing 16, (see Fig. 3). This aperture is in registration with the film aperture, (not shown), of the aperture plate 23. Its center is on an imaginary circle which passes through the axes of the several turret lenses. The front wall 24 of the housing is shouldered at 28 to provide an inset annular seat 29 for the turret; and the turret plate 27 has riveted thereto a flat steel ring 29' which serves as a bearing face for the turret on the seat 29. The ring 29' is provided with a peripheral flange 30 which embraces the front wall of the housing and assists in centering the turret on the housing.

The turret is revoluble on a pivot pin 31, (see Fig. 2), carried by the housing. A capped screw 32, threaded to the pivot pin 31, holds the turret detachably to the housing. The turret has three lens apertures therethrough; the axial centers 34 of which are at equal radial distances from the axis of the pivot 31, on the imaginary circle which passes through the center of the housing aperture 25, and are pitched apart 120 degrees on such imaginary circle. By rotation of the turret, therefore, any one of these three lens apertures may be made to register with the housing aperture 25. Detents comprising spring pressed plungers 35 seated in the periphery of the housing, and carrying rollers for engagement in indents 35' in the inner face of the flange 30 of the steel ring on the turret, determine the positions of true registration of a turret lens with the housing aperture 25, and serve to prevent accidental rotary displacement of the turret. Annuli 36 define the lens apertures and serve as supports for the barrels 37 in which the lenses are mounted. Lugs 39, punched up from the steel plate 29' hold the inner barrels of the lens mounts against rotary movement. All of the turret construction just described is old in the "Bell & Howell" camera heretofore mentioned.

As shown in Fig. 4, the filter 40 of the present invention is mounted in a slide of folded sheet material, and shows through windows in the latter. The slide is preferably of rectangular shape, and has its side edges bevelled, as shown at 42, for a dove-tail fit with a slideway in the housing 16. Ears 43 on the filter holder serve as finger pieces for inserting and removing the filter; and between the ears 43 the slide is cut back for clear vision through the finder lens 13.

In the formation of the slideway in the housing, the front wall of the housing is machined out, as shown at 44, inwardly from the front face thereof a distance sufficient for location of the slideway rearward of the detent devices 35. The slideway itself is an undercut or expansion of the recess 44, and is in the plane where the dove-tail 45 shows in Fig. 3. The recess from the front face to this plane is an incident.

In the aforesaid "Bell & Howell" camera as heretofore constructed, the turret flange 30 extended rearward further than shown in Fig. 3, that is to say, to a plane flush with the housing shoulder 47. The flange 30, as originally extended to the line 47, precludes positioning of the filter slideway in the plane in which the slideway is shown in Fig. 3. No mere slot or notch could have been made in the flange 30 to accommodate the filter, because the flange 30 is revoluble with the turret. On the other hand, to avoid unnecessary machining and weakening of the front wall of the casing, and amply to clear the filter from the shutter and other parts within the casing, it is desirable that the slideway be not located rearward of the plane 47. Hence, to provide for the filter, the flange 30 was cut back as just stated. Also, as just pointed out, such cut-back of the flange 30 is strictly limited by the presence of the detent devices 35. Furthermore, in the aforesaid "Bell & Howell" camera it is not feasible to position the filter forward of the detents 35.

The recess and slideway 44—45 is not of sufficient depth completely to perforate the front wall of the housing. A sufficient thickness 46 of front wall is left behind the recess to prevent undue weakening of the front wall, and to provide a seat for the filter slide, as well as to hold the filter holder clear of the shutter. Hence it is that in Fig. 2 what remains of the original aperture shows at 25 in the front wall part 46.

That there may be no reflection of light from the front face of wall part 46 it should be painted black. This part, however, serves as a seat for the filter holder, and any paint thereon should be protected from wear, and should furthermore not of itself offer obstruction to smooth and easy movement of the filter holder. To meet these conditions, an area of the part 46, indicated by the dotted line 46' in Figs. 2 and 3, and considerably larger than the filter window in the filter holder, is slightly countersunk or inset. This countersunk or inset portion is painted black. The actual seat for the holder of the filter is that portion of wall part 46 which lies beyond the countersink 46'.

I claim:

1. In a camera, a housing having a front wall in the form of a disk apertured for photographing therethrough, a multi-lens turret revoluble on said disk for selective registration of the turret lenses with said aperture, and having a flange embracing said disk, detent devices in the periphery of said disk for engagement with indents in said flange to determine settings of the turret for registration of the turret lenses and photographing aperture, and a filter slideway in the disk rearward of the rear edge of said turret flange.

2. In a camera, a housing having a front wall in the form of a disk apertured for photographing therethrough, a multi-lens turret revoluble on said disk for selective registration of the turret lenses with said aperture, and having a flange embracing said disk, detent devices in the periphery of said disk for engagement with indents in said flange to determine settings of the turret for registration of the turret lenses and photographing aperture, and a filter slideway in the disk rearward of the rear edge of said turret flange, said disk being cut out from its front face to the plane of said slideway, for formation of the latter.

3. In a camera, a housing having a front wall in the form of a disk apertured for photographing therethrough, a multi-lens turret revoluble on said disk for selective registration of the turret lenses with said aperture, and having a flange embracing said disk, co-operative means on said flange and disk for centering any desired turret lens with said photographing aperture, and the disk having a filter slideway rearward of the rear edge of said turret flange.

4. In a camera, a housing having a front wall with a photographing aperture therethrough, an aperture plate and means for guiding film thereover within said housing, a lens turret, means whereby the turret is revolubly secured to said front wall for selective registry with said aperture through the front wall of any one of a plurality of lenses on the turret, the front wall having means at the rear thereof in registry with the photographing aperture through the wall for holding a filter forward of said parts contained within the housing, and said filter holding means being clear of all parts which are revoluble with the turret, so that filters may be inserted and positioned in said filter holding means, and interchanged and removed therefrom, at any time and without regard to any rotary setting or movement of the turret.

5. In a camera, a housing having a front wall with a photographing aperture therethrough, an aperture plate and means for guiding film thereover within said housing, a lens turret, means whereby the turret is revolubly secured to said front wall for selective registry with said aperture through the front wall of any one of a plurality of lenses on the turret, co-operating means on the turret and housing for centering any selected lens with said photographing aperture in the housing wall, the front wall having means rearward of said centering means and in registry with the photographing aperture through the wall for holding a filter forward of said parts contained within the housing, and said filter holding means being clear of all parts which are revoluble with the turret, so that filters may be inserted and positioned in said filter holding means, and interchanged and removed therefrom, at any time and without regard to any rotary setting or movement of the turret.

THOMAS J. WALSH.